(12) United States Patent
Rosman et al.

(10) Patent No.: US 12,084,080 B2
(45) Date of Patent: Sep. 10, 2024

(54) SYSTEMS AND METHODS FOR LEARNING AND MANAGING ROBOT USER INTERFACES

(71) Applicant: Toyota Research Institute, Inc., Los Altos, CA (US)

(72) Inventors: Guy Rosman, Newton, MA (US); Daniel J. Brooks, Arlington, MA (US); Simon A. I. Stent, Cambridge, MA (US); Tiffany Chen, San Jose, CA (US); Emily Sarah Sumner, Mountain View, CA (US); Shabnam Hakimi, San Francisco, CA (US); Jonathan DeCastro, Arlington, MA (US); Deepak Edakkattil Gopinath, Chicago, IL (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 202 days.

(21) Appl. No.: 17/896,187

(22) Filed: Aug. 26, 2022

(65) Prior Publication Data
US 2024/0010218 A1 Jan. 11, 2024

Related U.S. Application Data

(60) Provisional application No. 63/358,997, filed on Jul. 7, 2022.

(51) Int. Cl.
*B60W 50/14* (2020.01)
*B25J 9/16* (2006.01)
(Continued)

(52) U.S. Cl.
CPC .............. *B60W 50/14* (2013.01); *B25J 9/161* (2013.01); *B25J 9/163* (2013.01); *B25J 11/008* (2013.01);
(Continued)

(58) Field of Classification Search
CPC .. B60W 50/14; B60W 40/09; B60W 50/0097; B60W 60/0015;
(Continued)

(56) References Cited

U.S. PATENT DOCUMENTS

| | | |
|---|---|---|
| 2010/0106603 A1 | 4/2010 | Dey et al. |
| 2023/0109398 A1* | 4/2023 | Kranski ................. B25J 9/161 700/250 |

OTHER PUBLICATIONS

Siewiorek, D. et al., "Multimodal Contextual Car-Driver Interface," Proceedings. Fourth IEEE International Conference on Multimodal Interfaces, Oct. 16, 2002, pp. 367-373, doi: 10.1109/ICMI.2002.1167023. (7 pages).

(Continued)

*Primary Examiner* — Nabil H Syed
*Assistant Examiner* — Cal J Eustaquio
(74) *Attorney, Agent, or Firm* — Christopher G. Darrow; Darrow Mustafa PC

(57) ABSTRACT

Systems and methods for learning and managing robot user interfaces are disclosed herein. One embodiment generates, based on input data including information about past interactions of a particular user with a robot and with existing HMIs of the robot, a latent space using one or more encoder neural networks, wherein the latent space is a reduced-dimensionality representation of learned behavior and characteristics of the particular user, and uses the latent space as input to train a decoder neural network associated with (1) a new HMI distinct from the existing HMIs or (2) a particular HMI among the existing HMIs to alter operation of the particular HMI. The trained first decoder neural (Continued)

network is deployed in the robot to control, at least in part, operation of the new HMI or the particular HMI in accordance with the learned behavior and characteristics of the particular user.

20 Claims, 5 Drawing Sheets

(51) Int. Cl.
| | |
|---|---|
| B25J 11/00 | (2006.01) |
| B60W 40/09 | (2012.01) |
| B60W 50/00 | (2006.01) |
| B60W 60/00 | (2020.01) |
| G06N 3/04 | (2023.01) |

(52) U.S. Cl.
CPC ........ *B60W 40/09* (2013.01); *B60W 50/0097* (2013.01); *B60W 60/0015* (2020.02); *G06N 3/04* (2013.01); *B60W 2050/0083* (2013.01); *B60W 2050/143* (2013.01); *B60W 2050/146* (2013.01); *B60W 2556/10* (2020.02)

(58) Field of Classification Search
CPC ... B60W 2050/0083; B60W 2050/143; B60W 2050/146; B60W 2556/10; B25J 9/161; B25J 9/163; B25J 11/008; G06N 3/04
See application file for complete search history.

(56) References Cited

OTHER PUBLICATIONS

Wu, G. et al., "A Joint Inverse Reinforcement Learning and Deep Learning Model for Drivers' Behavioral Prediction," CIKM '20, Retrieved from https://users.wpi.edu/~yli15/Includes/20_CIKM2020_Guojun.pdf, Oct. 19-23, 2020, pp. 2805-2812, (8 pages).

Hsiao, F. et al., "Learning a Multi-Modal Policy via Imitating Demonstrations with Mixed Behaviors," arXiv:1903.10304v1 [cs.LG], Mar. 25, 2019, Retrieved from https://arxiv.org/pdf/1903.10304.pdf?ref=https://githubhelp.com, pp. 1-10 (10 pages).

Liu, S. et al., "Learning to Navigate Intersections with Unsupervised Driver Trait Inference," Mar. 1, 2022, Retrieved from https://arxiv.org/pdf/2109.06783, pp. 1-7 (7 pages).

Morton, J. et al., "Simultaneous Policy Learning and Latent State Inference for Imitating Driver Behavior," Apr. 19, 2017, Retrieved from https://arxiv.org/abs/1704.05566, pp. 1-7 (7 pages).

C. Schaff and M. R. Walter, "Residual policy learning for shared autonomy," in RSS, 2020.

K. Backman, D. Kuli'c, and H. Chung, "Reinforcement learning for shared autonomy drone landings," 2022.

M. M. Tanjim, C. Su, E. Benjamin, D. Hu, L. Hong, and J. McAuley, "Attentive Sequential Models of Latent Intent for Next Item Recommendation". New York, NY, USA: Association for Computing Machinery, 2020, p. 2528-2534.

K. Song, W. Gao, S. Feng, D. Wang, K.-F. Wong, and C. Zhang, "Recommendation vs sentiment analysis: A text-driven latent factor model for rating prediction with cold-start awareness," in IJCAI, 2017, pp. 2744-2750.

Z. Yu, J. Lian, A. Mahmoody, G. Liu, and X. Xie, "Adaptive user modeling with long and short-term preferences for personalized recommendation," in Proceedings of the Twenty-Eighth International Joint Conference on Artificial Intelligence. California: International Joint Conferences on Artificial Intelligence Organization, Aug. 2019.

A. Xie, D. P. Losey, R. Tolsma, C. Finn, and D. Sadigh, "Learning latent representations to influence Multi-Agent interaction," Nov. 2020.

R. Yang, J. Chen, and K. Narasimhan, "Improving dialog systems for negotiation with personality modeling," in Annual Meeting of the Association for Computational Linguistics. Online: Association for Computational Linguistics, Aug. 2021, pp. 681-693.

R. McIlroy-Young, S. Sen, J. Kleinberg, and A. Anderson, "Aligning superhuman AI with human behavior: Chess as a model system," in SIGKDD, ser. KDD '20. New York, NY, USA: Association for Computing Machinery, Aug. 2020, pp. 1677-1687.

T. Shu, A. Bhandwaldar, C. Gan, K. A. Smith, S. Liu, D. Gutfreund, E. Spelke, J. B. Tenenbaum, and T. D. Ullman, "Agent: A benchmark for core psychological reasoning," Feb. 2021.

P. A. Tsividis, J. Loula, J. Burga, N. Foss, A. Campero, T. Pouncy, S. J. Gershman, and J. B. Tenenbaum, "Human-Level reinforcement learning through Theory-Based modeling, exploration, and planning," Jul. 2021.

X. Puig, T. Shu, S. Li, Z. Wang, Y.-H. Liao, J. B. Tenenbaum, S. Fidler, and A. Torralba, "Watch-And-Help: A challenge for social perception and Human-AI collaboration," Oct. 2020.

M. Carroll, R. Shah, M. K. Ho, T. L. Griffiths, S. A. Seshia, P. Abbeel, and A. Dragan, "On the Utility of Learning about Humans for Human-AI Coordination". Red Hook, NY, USA: Curran Associates Inc., 2019.

S. Omidshafiei, D.-K. Kim, M. Liu, G. Tesauro, M. Riemer, C. Amato, M. Campbell, and J. P. How, "Learning to teach in cooperative multiagent reinforcement learning," in Proceedings of the 33rd AAAI Conference on Artificial Intelligence, ser. AAAI'19/IAAI'19/EAAI'19. AAAI Press, 2019.

D. J. Strouse, K. R. McKee, M. Botvinick, E. Hughes, and R. Everett, "Collaborating with humans without human data," Oct. 2021.

D. Qiu, Y. Zhao, and C. Baker, "Latent belief space motion planning under cost, dynamics, and intent uncertainty," in Robotics: Science and Systems XVI, Jul. 2020.

S. Lefevre, A. Carvalho, Y. Gao, H. Eric Tseng, and F. Borrelli, "Driver models for personalized driving assistance," Veh. Syst. Dyn., vol. 53, No. 12, Jul. 2015.

R. Chandra, A. Bera, and D. Manocha, "StylePredict: Machine theory of mind for human driver behavior from trajectories," Nov. 2020.

L.-Y. Gui, Y.-X. Wang, D. Ramanan, and J. M. Moura, "Few-shot human motion prediction via meta-learning," in ECCV, 2018, pp. 432-450.

R. Akrour, M. Schoenauer, and M. Sebag, "APRIL: Active preference Learning-Based reinforcement learning," in Machine Learning and Knowledge Discovery in Databases. Springer Berlin Heidelberg, 2012, pp. 116-131.

C. Wirth, R. Akrour, G. Neumann, and J. Fuernkranz, "A survey of Preference-Based reinforcement learning methods," J. Mach. Learn. Res., vol. 18, No. 136, pp. 1-46, 2017.

D. Sadigh, A. Dragan, S. Sastry, and S. Seshia, "Active preference-based learning of reward functions," in Robotics: Science and Systems XIII. Robotics: Science and Systems Foundation, Jul. 2017.

D. Sadigh, S. S. Sastry, S. A. Seshia, and A. Dragan, "Information gathering actions over human internal state," in IROS, Oct. 2016, pp. 66-73.

J. Morton and M. J. Kochenderfer, "Simultaneous policy learning and latent state inference for imitating driver behavior," in ITSC, Oct. 2017, pp. 1-6.

W. Schwarting, A. Pierson, J. Alonso-Mora, S. Karaman, and D. Rus, "Social behavior for autonomous vehicles," Proc. Natl. Acad. Sci. U. S. A., vol. 116, No. 50, pp. 24972-24978, Dec. 2019.

N. Deo and M. M. Trivedi, "Multi-Modal trajectory prediction of surrounding vehicles with maneuver based LSTMs," in IVS, 2018.

X. Huang, S. G. McGill, J. A. DeCastro, L. Fletcher, and G. Rosman, "DiversityGAN: Diversity-Aware vehicle motion prediction via latent semantic sampling," IEEE Robotics and Automation Letters, vol. 5, No. 4, pp. 1-1, Jun. 2020.

J. Fu, K. Luo, and S. Levine, "Learning robust rewards with adverserial inverse reinforcement learning," Feb. 2018.

J. Schulman, F. Wolski, P. Dhariwal, A. Radford, and O. Klimov, "Proximal policy optimization algorithms," arXiv preprint arXiv:1707.06347, 2017.

L. Yu, T. Yu, C. Finn, and S. Ermon, "Meta-inverse reinforcement learning with probabilistic context variables," in Advances in Neu-

(56) References Cited

OTHER PUBLICATIONS ral Information Processing Systems, H. Wallach, H. Larochelle, A. Beygelzimer, F. d'Alch'e-Buc, E. Fox, and R. Garnett, Eds., vol. 32. Curran Associates, Inc., 2019.

S. Hochreiter and J. Schmidhuber, "Long short-term memory," Neural computation, vol. 9, No. 8, pp. 1735-1780, 1997.

R. Hadsel, S. Chopra, and Y. LeCun, "Dimensionality reduction by learning an invariant mapping," in CVPR, USA, 2006, p. 1735-1742.

E. Leurent, "An environment for autonomous driving decisionmaking," https://github.com/eleurent/highway-env, 2018.

M. Chan and A. Singhal, "The emotional side of cognitive distraction: Implications for road safety," Accident Analysis Prevention, vol. 50, pp. 147-154, 2013.

G. Brockman, V. Cheung, L. Pettersson, J. Schneider, J. Schulman, J. Tang, and W. Zaremba, "OpenAI gym," 2016.

M. Treiber, A. Hennecke, and D. Helbing, "Congested traffic states in empirical observations and microscopic simulations," Phys. Rev. E Stat. Phys. Plasmas Fluids Relat. Interdiscip. Topics, vol. 62, No. 2 Pt A, pp. 1805-1824, Aug. 2000.

\* cited by examiner

SYSTEMS AND METHODS FOR LEARNING AND MANAGING ROBOT USER INTERFACES

CROSS-REFERENCE TO RELATED APPLICATION

This application claims the benefit of U.S. Provisional Patent Application No. 63/358,997, "Methods and Systems for Applying, to a User Interface, a Learned Latent Space Associated with a Driver," filed on Jul. 7, 2022, which is incorporated by reference herein in its entirety.

TECHNICAL FIELD

The subject matter described herein generally relates to robots and, more particularly, to systems and methods for learning and managing robot user interfaces.

BACKGROUND

One challenge in robotics applications in which the robots interact with human users is designing and implementing effective Human-Machine Interfaces (HMIs). For example, in some applications, the robot is a vehicle, and the user is the driver of the vehicle. The driver might interact with an adaptive cruise control (ACC) system, a collision warning system, a Lane Keeping Assist System (LKAS), or other vehicle systems. Each of these vehicle systems has an associated user interface including visual and/or audible warnings and various features through which the driver can interact with the system in question. For example, the driver might deactivate the ACC system by pressing the accelerator pedal or the brake pedal.

Different drivers have different HMI preferences. For example, one driver might prefer visual warnings or notifications over the audible variety. Another driver might not like warnings or technological "hand-holding" in general. One driver might be highly technologically savvy, whereas another driver might be somewhat averse to technology. These personal preferences present challenges to vehicle HMI designers. Analogous challenges exist in other robotics applications such as service robots.

SUMMARY

An example of a system for learning and managing robot user interfaces is presented herein. The system comprises a processor and a memory storing machine-readable instructions that, when executed by the processor, cause the processor to generate, based on input data that includes information about past interactions of a particular user with a robot and with one or more existing Human-Machine Interfaces (HMIs) of the robot, a latent space using one or more encoder neural networks, wherein the latent space is a reduced-dimensionality representation of learned behavior and characteristics of the particular user. The memory also stores machine-readable instructions that, when executed by the processor, cause the processor to use the latent space as input to train a first decoder neural network associated with one of (1) a new HMI of the robot distinct from the one or more existing HMIs of the robot and (2) a particular HMI among the one or more existing HMIs of the robot to alter operation of the particular HMI. The trained first decoder neural network is deployed in the robot to control, at least in part, operation of one of the new HMI and the particular HMI in accordance with the learned behavior and characteristics of the particular user.

Another embodiment is a non-transitory computer-readable medium for learning and managing robot user interfaces and storing instructions that, when executed by a processor, cause the processor to generate, based on input data that includes information about past interactions of a particular user with a robot and with one or more existing Human-Machine Interfaces (HMIs) of the robot, a latent space using one or more encoder neural networks, wherein the latent space is a reduced-dimensionality representation of learned behavior and characteristics of the particular user. The instructions also cause the processor to use the latent space as input to train a first decoder neural network associated with one of (1) a new HMI of the robot distinct from the one or more existing HMIs of the robot and (2) a particular HMI among the one or more existing HMIs of the robot to alter operation of the particular HMI. The trained first decoder neural network is deployed in the robot to control, at least in part, operation of one of the new HMI and the particular HMI in accordance with the learned behavior and characteristics of the particular user.

In another embodiment, a method of learning and managing robot user interfaces is disclosed. The method comprises generating, based on input data that includes information about past interactions of a particular user with a robot and with one or more existing Human-Machine Interfaces (HMIs) of the robot, a latent space using one or more encoder neural networks, wherein the latent space is a reduced-dimensionality representation of learned behavior and characteristics of the particular user. The method also includes using the latent space as input to train a first decoder neural network associated with one of (1) a new HMI of the robot distinct from the one or more existing HMIs of the robot and (2) a particular HMI among the one or more existing HMIs of the robot to alter operation of the particular HMI. The trained first decoder neural network is deployed in the robot to control, at least in part, operation of one of the new HMI and the particular HMI in accordance with the learned behavior and characteristics of the particular user.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
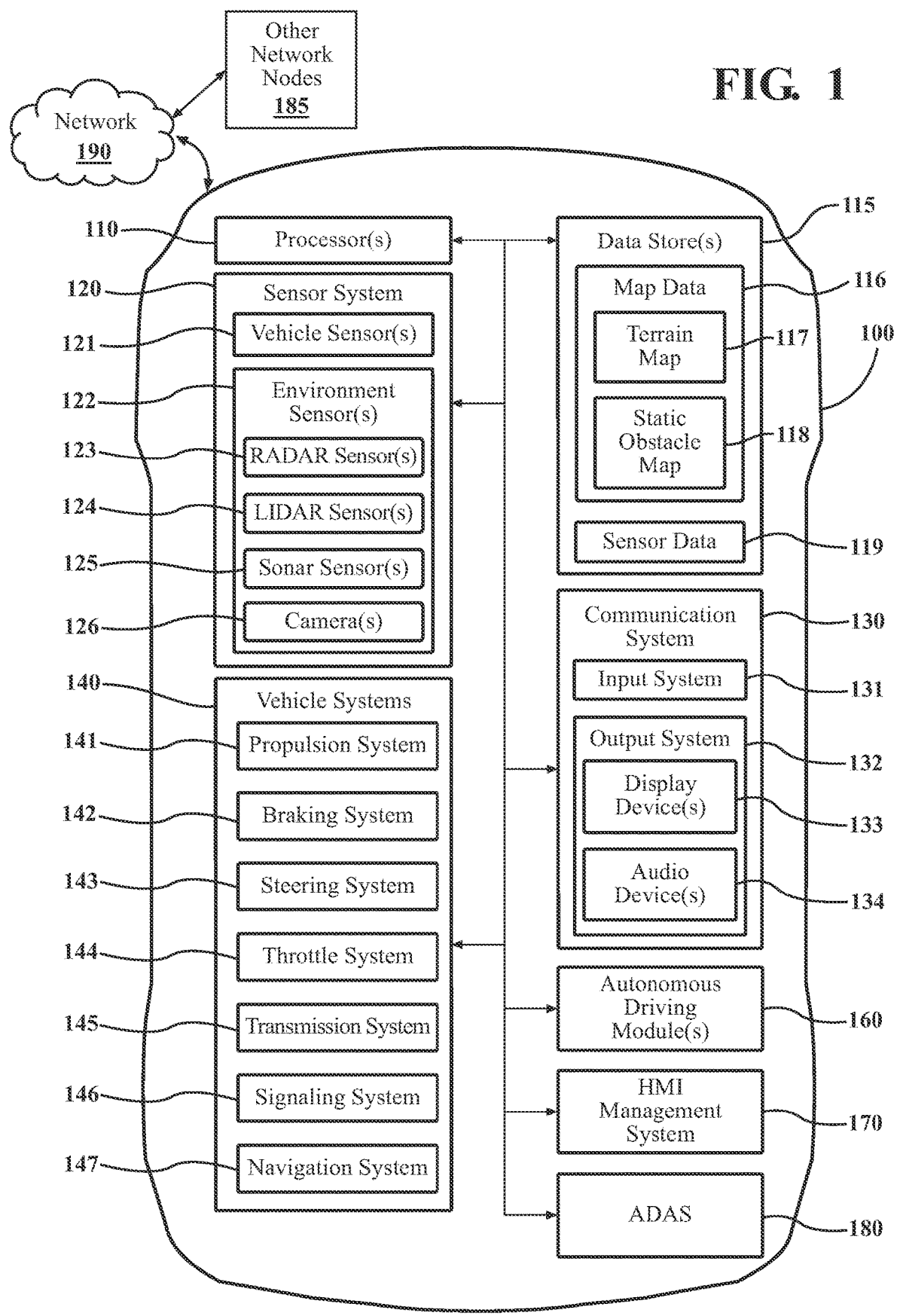
FIG. 1 illustrates one embodiment of a vehicle within which systems and methods disclosed herein may be implemented.

Various embodiments disclosed herein efficiently and effectively address the challenge of customizing a robot's Human-Machine Interface(s) (HMI(s)) for a particular user. These embodiments go beyond the prior-art approach of observing and storing a user's choices and preferences as the user interacts with a HMI and automatically applying the stored preferences in the appropriate contexts. In these embodiments, a potentially large amount of data regarding a user's interactions with a robot and its existing HMIs (user interfaces) is processed by a machine-learning-based system to generate a reduced-dimensionality latent space (also sometimes referred to herein as an "embedding space") that represents learned behavior and characteristics of the specific user.

The learned latent space associated with a particular user permits what has been learned about the user's behavior and characteristics to be generalized and applied to the training of a new HMI of the robot with which the user has not yet interacted or to the adjustment/improvement of an existing HMI of the robot. For example, in the latter case, a continuous parameter of a vehicle's collision warning system such as a time/distance threshold can be tuned in accordance with the driver's learned preferences, as represented by the latent space. Importantly, either objective—training a new HMI or adjusting the operation of an existing HMI—can be achieved without the need to reprocess the voluminous input data from which the latent space was generated.

In one embodiment, a HMI training system generates, based on input data that includes information about past interactions of a particular user with a robot and with one or more existing HMIs of the robot, a latent space using one or more encoder neural networks. As explained above, the latent space is a reduced-dimensionality representation of the particular user's learned behavior and characteristics. The system can then use the latent space as input to train a decoder neural network associated with either (1) a new HMI of the robot distinct from the one or more existing HMIs of the robot or (2) a particular HMI among the one or more existing HMIs of the robot. In the case of an existing HMI, the purpose for training the decoder neural network is to alter (e.g., improve, customize) the operation of the particular existing HMI. The trained decoder network is deployed in the robot to control, at least in part, the operation of the new HMI or the particular existing HMI in accordance with the learned behavior and characteristics of the particular user, as represented by the latent space.

The principles and techniques discussed herein in connection with the various embodiments can be applied to a variety of different kinds of robots, including, without limitation, vehicles and service robots or other types of assistive robots that interact with humans. For simplicity, vehicular embodiments in which the robot is a vehicle and the associated user is the driver of that vehicle will be emphasized throughout the remainder of this description.

Referring to FIG. 1, an example of a vehicle 100, in which systems and methods disclosed herein can be implemented, is illustrated. As used herein, a "vehicle" is any form of motorized transport, such as, but not limited to, an automobile. In some embodiments, vehicle 100 is driven manually by a human driver. In other embodiments, vehicle 100 can operate in one or more semi-autonomous driving modes by virtue of an adaptive cruise control (ACC) system, a Lane Keeping Assist System (LKAS), a parking-assistance system, or an Advanced Driver-Assistance System (ADAS) 180. In still other embodiments, vehicle 100 can operate, at least some of the time, in a highly autonomous driving mode (e.g., what the automotive industry refers to as autonomy Levels 3-5).

The principles and techniques of the embodiments described herein are applicable to all the various vehicle operating modes just mentioned (manual, semi-autonomous, and autonomous) because a driver or other occupant of a vehicle 100 interacts with one or more HMIs of the vehicle regardless of the particular driving mode in which the vehicle 100 is operating. In fact, some interactions between the driver and the HMIs of vehicle 100 involve switching from one driving mode to another (e.g., switching from autonomous driving to manual driving in response to the user taking hold of the steering wheel). As shown in FIG. 1, vehicle 100 can include a HMI management system 170 or capabilities to support or interact with the HMI management system 170 and thus benefits from the functionality discussed herein. Instances of vehicle 100, as used herein, are equally applicable to any device capable of incorporating the systems or methods described herein. As mentioned above, the techniques disclosed herein can be applied to the HMIs of other types of robots besides vehicles. For example, those techniques can be applied to indoor or outdoor service robots, companionship robots, or other types of assistive robots that interact with human users via one or more HMIs.

The vehicle 100 also includes various elements. It will be understood that, in various implementations, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including HMI management system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 can communicate with other network nodes 185 (e.g., a HMI training system, other connected vehicles, cloud servers, edge servers, roadside units, infrastructure) via a network 190. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122 can be used to detect objects (e.g., external road agents such as other vehicles, bicyclists, motorcyclists, pedestrians, and animals) and, in other respects, understand the environment surrounding vehicle 100 and its associated traffic situations and conditions. This process is sometimes referred to as "traffic-situation understanding" or "scene understanding."

In embodiments in which vehicle 100 is capable of autonomous operation (e.g., Levels 3-5), vehicle 100 includes autonomous driving module(s) 160 to control various aspects of autonomous driving. In some embodiments, ADAS 180 operates in conjunction with autonomous driving module(s) 160 to provide semi-autonomous driving capabilities such as lane-keeping assistance and automatic collision avoidance.

A HMI management system 170 deployed in a vehicle 100 can manage (direct the operation of) one or more HMIs of the vehicle. Herein, a "HMI" refers to a combination of hardware (e.g., processors, warning lights, sound-emitting devices, buttons, dials, knobs, switches, levers, touchscreens, etc.) and software or firmware (e.g., program code, data, icons and other virtual user-interface elements) by which a user interacts with a robot (e.g., a vehicle 100) and its various features, capabilities, and operating modes. In some embodiments, an HMI supports interactions through which the user can control (activate, deactivate, etc.) an operational mode of the robot (e.g., a vehicle 100). For example, in a vehicular embodiment, a HMI can include predetermined actions by which a driver can interact with an ACC system, a collision warning system, a LKAS, or other vehicle systems.

In-vehicle embodiments that operate in test/inference mode are discussed in greater detail below in connection with FIG. 4. First, however, a HMI training system 200 is discussed in connection with FIGS. 2 and 3.

Figure 2:
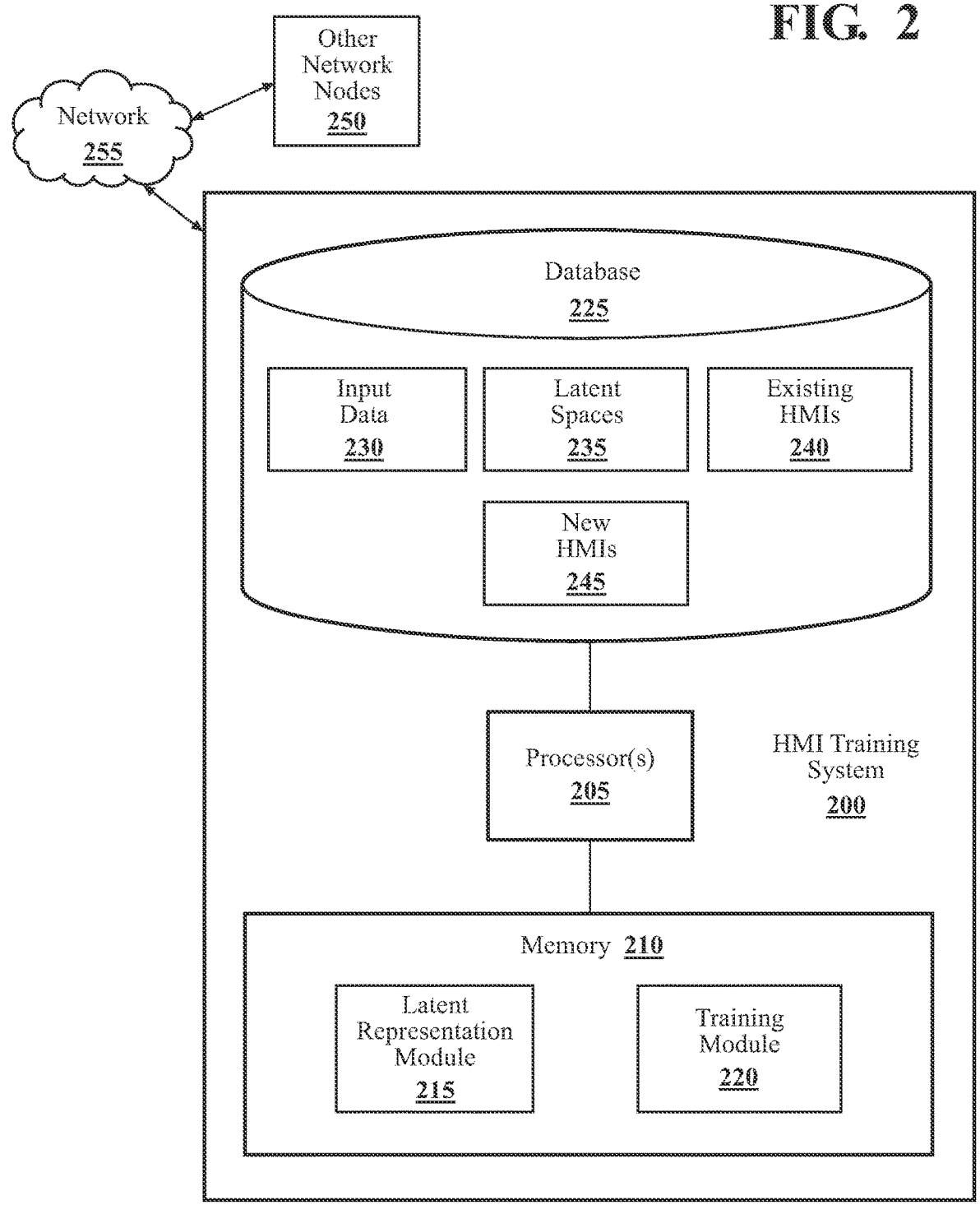
FIG. 2 is a block diagram of a Human-Machine Interface (HMI) training system, in accordance with an illustrative embodiment of the invention.

FIG. 2 is a block diagram of a HMI training system 200, in accordance with an illustrative embodiment of the invention. In some embodiments, HMI training system 200 is implemented in a server or workstation (e.g., at an automobile manufacturer's research and development facility). In this embodiment, HMI training system 200 is shown as including one or more processors 205, and memory 210 stores a latent representation module 215 and a training module 220. The memory 210 is a random-access memory (RAM), read-only memory (ROM), a hard-disk drive, a flash memory, or other suitable memory for storing the modules 215 and 220. The modules 215 and 220 are, for example, computer-readable instructions that, when executed by the one or more processors 205, cause the one or more processors 205 to perform the various functions disclosed herein.

HMI training system 200 can store various kinds of data in a database 225. Examples include input data 230, latent spaces 235, existing HMIs 240, and new HMIs 245. The existing HMIs 240 and the new HMIs 245 in FIG. 2 can be, for example, parameters associated with the HMIs and/or program code implementing the HMIs, depending on the embodiment.

As shown in FIG. 2, HMI training system 200 can communicate with one or more other network nodes 250 (e.g., other servers or workstations, client computers, connected vehicles 100, mobile devices, etc.) via network 255. For example, HMI training system 200 can communicate with vehicles 100 and other networked computers to acquire various kinds of input data 230 for training neural networks and can transmit trained decoder neural networks and latent spaces 235 (or portions thereof) to the vehicles 100 for deployment in an in-vehicle HMI management system 170. This is discussed in further detail below in connection with FIG. 4.

Latent representation module 215 generally includes machine-readable instructions that, when executed by the one or more processors 205, cause the one or more processors 205 to generate, based on input data 230 that includes information about past interactions of a particular user with a robot (e.g., a vehicle 100) and with one or more existing HMIs 240 of vehicle 100, a latent space 235 using one or more encoder neural networks. As explained above, the latent space 235 is a reduced-dimensionality representation of learned behavior and characteristics of the particular user.

Input data 230 can include a variety of different kinds of data. Some or all of the input data 230 discussed below can be uploaded to HMI training system 200 from one or more vehicles 100. First, in a vehicular embodiment, input data 230 can include the kind of sensor data from environment sensor(s) 122 (cameras, LIDAR, etc.) that is often used in machine-learning-based prediction applications (e.g., prediction of future road-agent trajectories and behavior). This kind of input data provides information about the context and setting in which a driver's behavior or choices occur. For example, a driver might drive somewhat differently in an urban, suburban, or highway setting. The environmental sensor data can include information about the state of vehicle 100 and the states of other road agents (other vehicles, pedestrians, etc.) in the vicinity of vehicle 100. In some embodiments, the environmental sensor data includes data (e.g., camera/video images, biometric data, etc.) from a driver monitoring system (DMS) in the passenger compartment of the vehicle 100. Such DMS data can provide information about the driver's attentiveness/distractedness, alertness, emotional state, etc.

Second, input data 230 can include information from various kinds of logs stored by a vehicle 100. Such logs can include detailed information about a driver's interactions with the controls and functions of the robot (i.e., vehicle 100) and the driver's interactions with one or more of the vehicle's existing HMIs 240.

Third, input data 230, in some embodiments, includes the user's (in the embodiment of FIG. 2, the driver's) responses to questionnaires regarding one or more existing HMIs 240. Such questionnaire responses can reveal the underlying motivations and reasons for the driver's behavior and preferences.

As those skilled in the art will recognize, several different kinds of neural networks can be used to encode the input data 230 to generate the latent space 235 for a particular driver. For example, in some embodiments latent representation module 215 employs a Long Short-Term Memory (LSTM) encoder. In other embodiments, an attention network or a transformer network can be used. In yet another embodiment, a neural network that performs temporal convolution (a convolutional neural network or CNN) can be used. As discussed above, the latent space 235 is a reduced-dimensionality representation of learned behavior and characteristics of a particular driver. That is, latent space 235 represents an efficient way to represent a large amount of information learned about a particular driver from a potentially large body of data. That information can be applied to efficiently train new HMIs 245 for vehicle 100 or to adjust how an existing HMI 240 operates.

A wide variety of driver behavior and characteristics can be captured by a latent space 235. Some examples in a vehicular context include, without limitation, aggressiveness (e.g., in acceleration, braking, cornering, following distance, behavior toward vulnerable road users such as pedestrians, etc.), attentiveness/distractedness, stamina (ability to remain alert on long drives), ability to handle clutter or confusion in the environment, level of inhibitory control (ability to suppress or countermand a thought, action, or feeling), predisposition toward technology (e.g., "early adopter," competent user of technology, "technophobe," etc.), response time, and preferences regarding visual and/or auditory warnings/notifications in vehicle 100 (e.g., a driver might dislike audible warnings but tolerate or even welcome visual notifications via lights, an in-vehicle display, etc.).

Training module 220 generally includes machine-readable instructions that, when executed by the one or more processors 205, cause the one or more processors 205 to use the latent space 235 as input to train a decoder neural network associated with either (1) a new HMI 245 of vehicle 100 distinct from the existing HMIs 240 of vehicle 100 or (2) a particular existing HMI 240 among the existing HMIs 240 of vehicle 100. As explained above, in the latter case, the purpose of training the decoder neural network is to alter (improve, customize) the operation of the particular existing HMI 240 in vehicle 100, when the trained decoder neural network is downloaded to and deployed in vehicle 100.

As those skilled in the art will recognize, the choice of decoder neural network can differ, depending on the embodiment. In some embodiments, the decoder neural network is a fully connected neural network. In other embodiments, the decoder neural network is a LSTM decoder network, an attention network, or a neural network configured in accordance with a reinforcement-learning (RL) approach.

In some embodiments, training module 220 trains additional decoder neural networks for specific purposes using the latent space 235 as input. For example, in one embodiment, training module 220 trains a second decoder neural network to predict future behavior of the particular driver whose past behavior and characteristics are represented by latent space 235, and training module 220 trains a third decoder neural network to label (e.g., annotate) observed behavior of the particular driver. Such labels can be categorical (e.g., "aggressive driver," "technologically savvy driver," etc.), or they can be noncategorical (e.g., "unsafe cornering maneuver," "driver is following leading vehicle too closely," etc.), depending on the embodiment. Examples of some of the different decoder neural networks training module 220 can train, in one embodiment, are discussed further below in connection with FIG. 3.

In an embodiment in which training module 220 uses the latent space 235 as input to train a decoder neural network for the purpose of altering the operation of a particular existing HMI 240, the training can involve any of several different kinds of HMI changes or adjustments. Examples include, without limitation, (1) tuning a continuous parameter of a safety-related system of the vehicle 100 (e.g., tuning a time/distance threshold of a collision warning system); (2) changing the frequency of activation and the intensity of one or more visual indicators (lights, displays, etc.) in vehicle 100; (3) changing the frequency of activation and the volume of one or more audible indicators (beeps, chimes, computer-synthesized or recorded spoken messages, etc.) in vehicle 100; and (4) changing whether vehicle 100 automatically activates or deactivates a feature in response to detection of a predetermined situation. Such customized adjustments to existing HMIs are made possible by what the latent space 235 captures regarding the particular driver's behavior, characteristics, and preferences.

Whether training module 220 is using latent space 235 as input to train a decoder neural network associated with a new HMI 245 or an existing HMI 240, in some embodiments the training cues for supervised training can include examples of effective driver coaching/teaching, and training module 220 can train the decoder neural network to coach the particular driver concerning the new HMI 245 or the existing HMI 240. In some embodiments, training module 220 trains the decoder neural network to coach the particular driver concerning the control of an operational mode of the robot (e.g., vehicle 100). Such control can include activation, deactivation, regulation, adjustment, etc. For example, the coaching can assist the particular driver in interacting with an ACC system, a collision warning system, a LKAS, or other vehicle systems. In an eventual in-vehicle test/inference deployment of the trained decoder neural network in a HMI management system 170, the particular driver can receive coaching that includes instructional or informational tips or prompts. For example, if the latent space 235 of a particular driver captures that the driver is not very technologically savvy, a new HMI 245 can be configured, by virtue of the training the decoder neural network received from training module 220, to be generous with coaching/prompting to assist the driver in using an advanced feature such as ACC or lane-keeping assistance.

Figure 3:
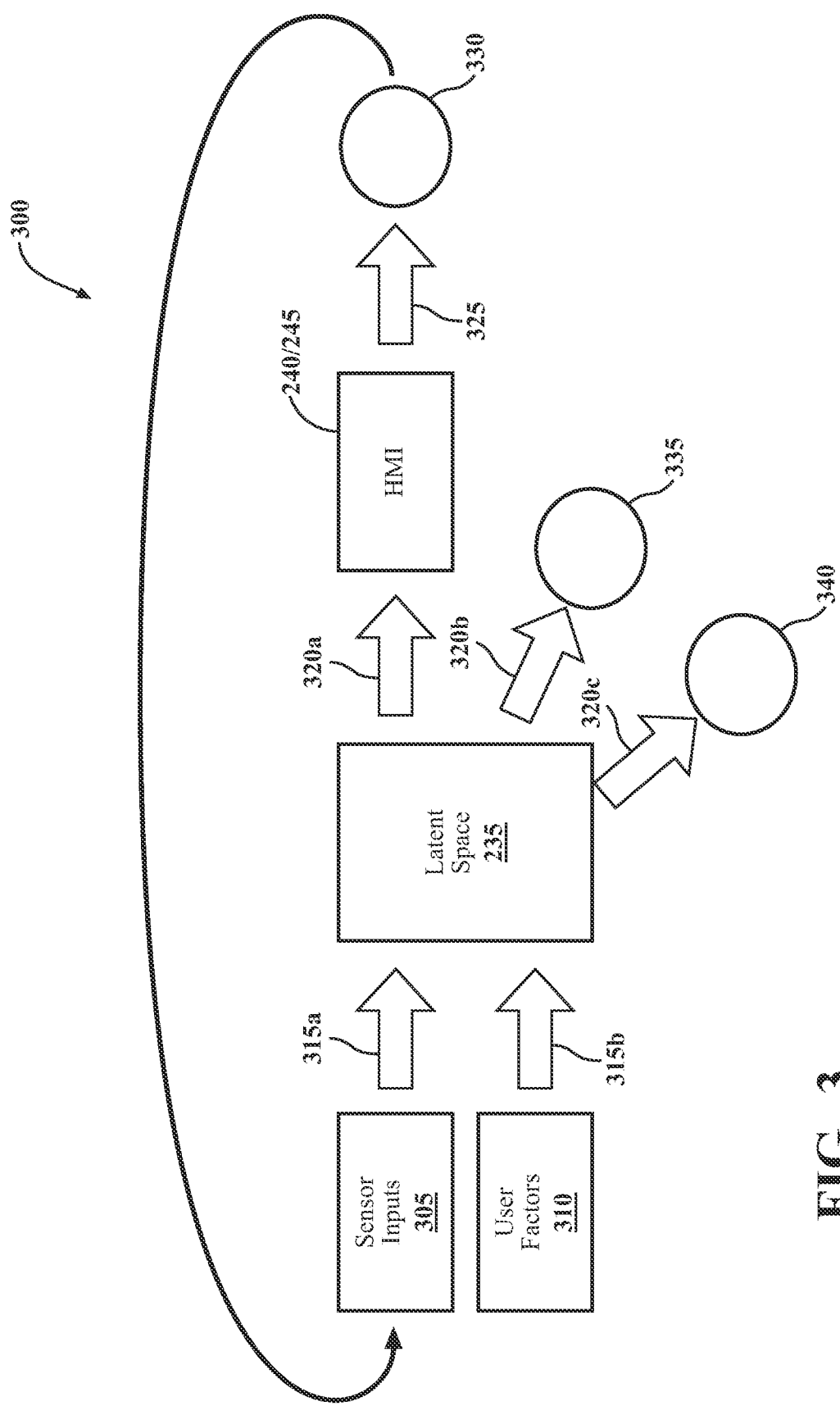
FIG. 3 illustrates a processing flow of a HMI training system, in accordance with an illustrative embodiment of the invention.

FIG. 3 illustrates a processing flow 300 of the HMI training system 200 discussed above in connection with FIG. 2, in accordance with an illustrative embodiment of the invention. In the embodiment of FIG. 3, sensor inputs 305 and user factors 310 (e.g., questionnaire responses and other a priori information about the user), both of which are examples of the input data 230 discussed above, are input to encoder neural network 315a and encoder neural network 315b, respectively. The encoder neural networks 315 generate a latent space 235 for a particular user. As discussed above, in a vehicular embodiment, the robot is a vehicle 100, and the particular user is the driver of that vehicle 100.

In the embodiment of FIG. 3, HMI training system 200 includes three decoder neural networks, decoder neural network 320a, decoder neural network 320b, and decoder neural network 320c. As discussed above, training module 220 uses the latent space 235 as input to train the three decoder neural networks 320. As indicated in FIG. 3, training module 220 trains decoder neural network 320a in connection with a HMI 240/245 (i.e., a new HMI 245 or an existing HMI 240) of the target robot. Training cues for decoder neural network 320a can include, for example, interviews/questionnaires, selected examples, and/or annotations of various kinds of user-related data (e.g., logs containing user interactions with a robot such as a vehicle 100 and one or more HMIs 240 of the vehicle 100). A cost-function calculation 325 produces information that is fed back during the training process, as indicated in FIG. 3.

Training module 220 trains decoder neural network 320b to predict the particular user's future behavior (e.g., choices and preferences with respect to an HMI). During training, training module 220 monitors the computed prediction error 335 to provide the feedback needed to train the model. In one embodiment, the cues for training behavior prediction include future logs of user interactions with HMIs 240. Training module 220 trains decoder neural network 320c to label observed behavior of the particular user. As discussed above, such annotations of user behavior can be categorical or non-categorical, depending on the embodiment. The cues during training for the labeling decoder neural network 320c are similar to those discussed above for an HMI 240/245 (decoder neural network 320a).

One major advantage of the various embodiments disclosed herein is that once a latent space 235 has been learned for a particular user (e.g., a particular driver of a vehicle 100), that latent space 235 can be used as input to train the decoder neural networks 320 even if the decoder neural network 320 to be trained is associated with a new HMI 245 with which the user has never interacted in the past. This avoids the need to train the decoder network for a new HMI 245 using the potentially voluminous input data 230 that was used to generate the latent space 235. As discussed above, the latent space 235 can also be used to train a decoder neural network 320 for the purpose of updating or otherwise changing the operation of an existing HMI 240.

In a vehicular embodiment, once a given decoder neural network 320 has been sufficiently trained, the trained decoder neural network parameters can be downloaded from HMI training system 200 to the vehicle 100 driven by the particular driver for whom the latent space 235 was generated. In some embodiments, some or all of the latent space 235 corresponding to the driver is also downloaded to the vehicle 100 and used by a HMI management system 170 in the vehicle 100. As part of an over-the-air program-code update or upgrade, HMI training system 200 can also download a new HMI 245 or an updated/modified existing HMI 240 to a vehicle 100. In other robotics applications (e.g., a service robot), the trained decoder neural network(s) 320 and any associated new or updated HMIs can be downloaded to an analogous HMI management system in the robot to manage the operation of those HMIs. An example of a test/inference-mode deployment of one or more trained decoder neural networks 320 in a HMI management system 170 of a vehicle 100 is discussed below in connection with FIG. 4.

Figure 4:
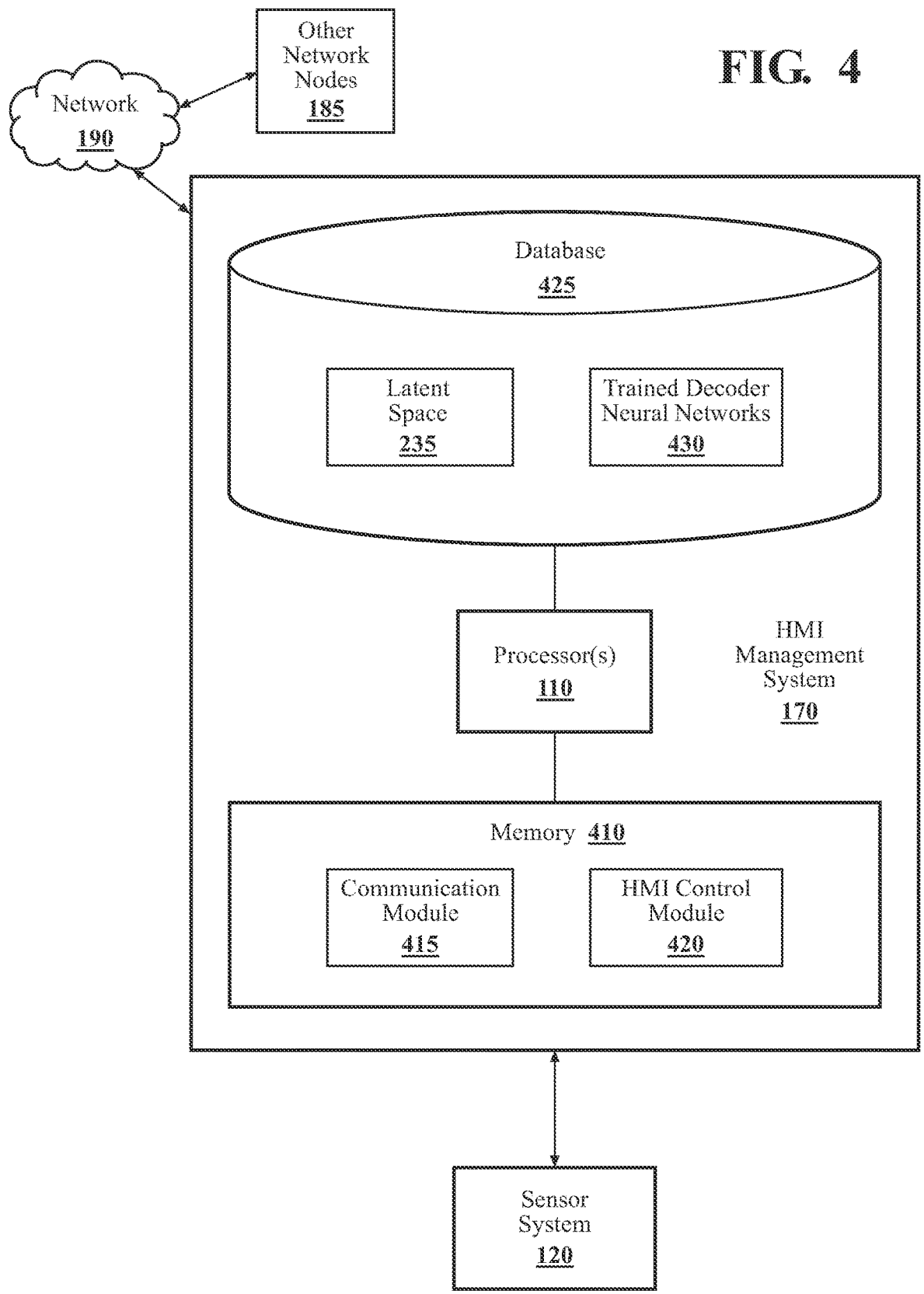
FIG. 4 is a block diagram of a HMI management system deployed in a vehicle, in accordance with an illustrative embodiment of the invention.

FIG. 4 is a block diagram of a HMI management system 170, in accordance with an illustrative embodiment of the invention. In this embodiment, HMI management system 170, deployed in a vehicle 100, is shown as including one or more processors 110 from the vehicle 100 of FIG. 1. In general, the one or more processors 110 may be a part of HMI management system 170, HMI management system 170 may include one or more separate processors from the one or more processors 110 of the vehicle 100, or HMI management system 170 may access the one or more processors 110 through a data bus or another communication path, depending on the embodiment.

In this embodiment, memory 410 stores a communication module 415 and a HMI control module 420. The memory 410 is a random-access memory (RAM), read-only memory (ROM), a hard-disk drive, a flash memory, or other suitable memory for storing the modules 415 and 420. The modules 415 and 420 are, for example, computer-readable instructions that, when executed by the one or more processors 110, cause the one or more processors 110 to perform the various functions disclosed herein.

As shown in FIG. 4, HMI management system 170 can communicate with one or more other network nodes 185 (e.g., HMI training system 200, other connected vehicles, other cloud servers, edge servers, roadside units, infrastructure) via network 190. HMI management system 170 can also interface and communicate with sensor system 120 to obtain various kinds of sensor data that are input to one or more machine-learning-based models (e.g., trained decoder neural networks 320 downloaded from HMI training system 200) that are part of HMI management system 170.

HMI management system 170 can store various kinds of data in a database 425. One example is a learned latent space 235 downloaded from HMI training system 200. Another example is one or more trained decoder neural networks 430 (refer also to decoder neural networks 320 in FIG. 3) downloaded from HMI training system 200 that are associated with one or more new HMIs 245 or existing HMIs 240 of vehicle 100.

Communication module 415 generally includes machine-readable instructions that, when executed by the one or more processors 110, cause the one or more processors 110 to communicate with HMI training system 200 via network 190 to download one or more trained decoder neural networks 430. Each downloaded trained decoder neural network 430 is associated with either a new HMI 245 or an existing HMI 240 of vehicle 100. A given downloaded trained decoder neural network 430 manages (governs the operation of) an associated HMI in vehicle 100.

In some embodiments, communication module 415 also includes machine-readable instructions that, when executed by the one or more processors 110, cause the one or more processors 110 to download, from HMI training system 200, all or a portion of the latent space 235 pertaining to the driver of the vehicle 100. In some embodiments, HMI management system 170 makes further use of the latent space 235 (or a portion thereof) in connection with managing the vehicle's HMIs.

In some embodiments, communication module 415 also includes machine-readable instructions that, when executed by the one or more processors 110, cause the one or more processors 110 to upload, to HMI training system 200, various kinds of input data 230 associated with the driver of vehicle 100. This can include, for example, sensor data from sensor system 120, log data, DMS data, questionnaire responses, etc. This uploaded input data 230 is used by HMI training system 200 as explained above in connection with FIG. 2.

HMI control module 420 generally includes machine-readable instructions that, when executed by the one or more processors 110, cause the one or more processors 110 to control, at least in part, the operation of either a new HMI 245 or a particular existing HMI 240 in accordance with the learned behavior and characteristics of the driver of vehicle 100. As discussed above, the driver's learned behavior and characteristics are represented compactly and efficiently by the driver's latent space 235 generated by HMI training system 200. As also discussed above, the latent space 235 is used as input by the training module 220 of HMI training system 200 to train a decoder neural network 320 associated with the applicable HMI. This enables the HMI control module 420 of HMI management system 170 to employ a trained decoder neural network 430 downloaded from HMI training system 200 to at least partially control the operation of the associated new HMI 245 or existing HMI 240 in a manner that is customized or personalized for the driver of vehicle 100.

Figure 5:
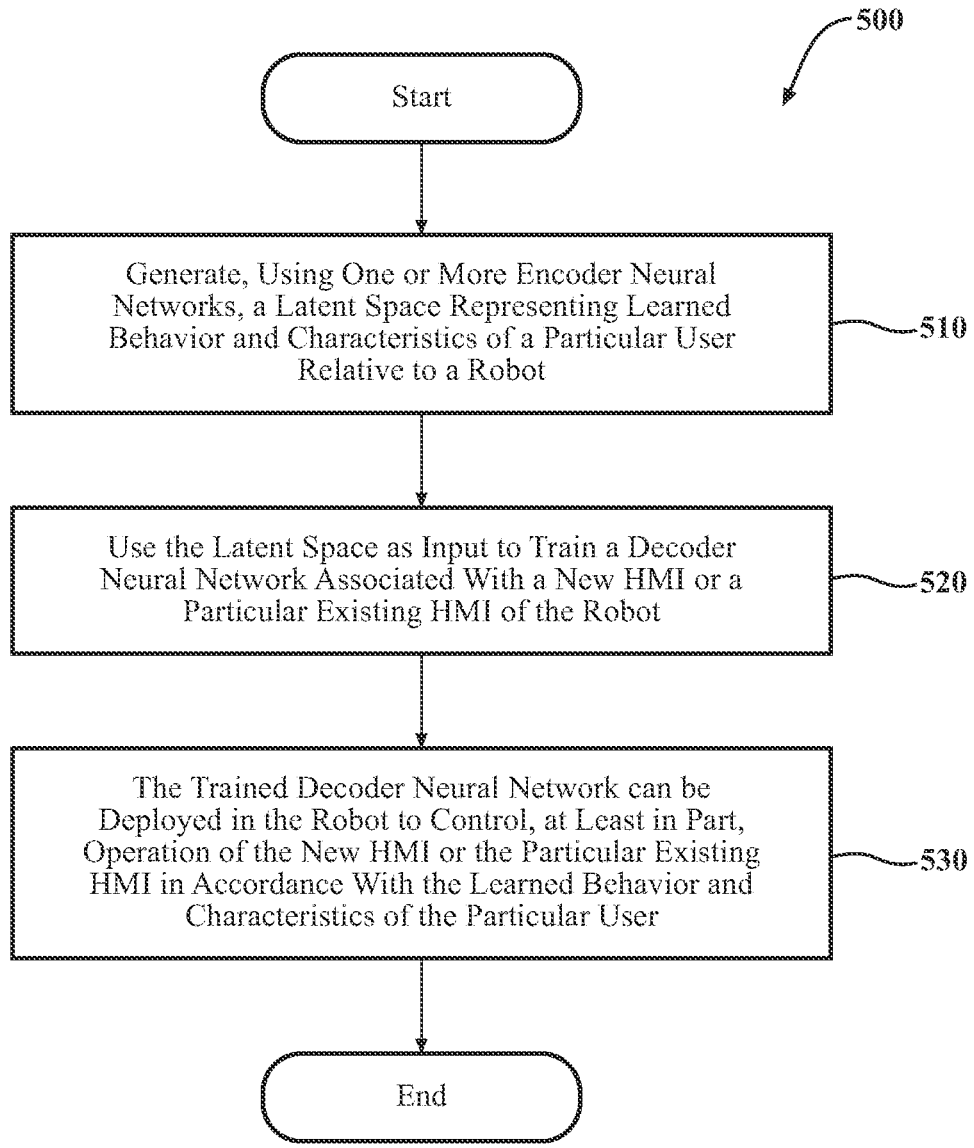
FIG. 5 is a flowchart of a method of learning and managing robot user interfaces, in accordance with an illustrative embodiment of the invention.

FIG. 5 is a flowchart of a method 500 of learning and managing robot user interfaces, in accordance with an illustrative embodiment of the invention. Method 500 will be discussed from the perspective of the HMI training system 200 in FIG. 2. While method 500 is discussed in combination with HMI training system 200, it should be appreciated that method 500 is not limited to being implemented within HMI training system 200, but HMI training system 200 is instead one example of a system that may implement method 500. In other embodiments, "driver" generalizes to "user," and "vehicle 100" generalizes to "robot." For simplicity, the discussion of method 500 below focuses on a vehicular embodiment.

At block 510, latent representation module 215 generates, based on input data 230 that includes information about past interactions of the driver of a vehicle 100 with one or more existing HMIs 240 of the vehicle 100, a latent space 235 using one or more encoder neural networks 315. As discussed above, the latent space 235 is a reduced-dimensionality representation of learned behavior and characteristics of the driver. As also discussed above, input data 230 can include various kinds of environmental and state information from the sensor system 120 of vehicle 100, information from various kinds of logs stored by a vehicle 100, and responses to questionnaires regarding one or more existing HMIs 240. As also discussed above, several different kinds of neural networks (315) can be used to encode the input data 230 to generate the latent space 235 for a particular driver of an associated vehicle 100. For example, in some embodiments latent representation module 215 employs a LSTM encoder network. In other embodiments, an attention network or a transformer network can be used. In yet another embodiment, a CNN can be used. As discussed above, latent space 235 represents an efficient way to represent a large amount of information learned about the particular driver. That information can be applied to efficiently train new HMIs 245 for vehicle 100 or to adjust how an existing HMI 240 operates.

At block 520, training module 220 uses the latent space 235 as input to train a decoder neural network 320 (sometimes referred to herein as a "first decoder neural network") associated with either (1) a new HMI 245 of the vehicle 100 distinct from the one or more existing HMIs 240 of the vehicle 100 or (2) a particular existing HMI 240 among the one or more existing HMIs 240 of vehicle 100. As explained above, in the latter case, the purpose of training the decoder neural network 320 is to alter (improve, customize) the operation of the particular existing HMI 240 in vehicle 100. As discussed above, the choice of decoder neural network 320 can differ, depending on the embodiment. In some embodiments, the decoder neural network 320 is a fully connected neural network. In other embodiments, the decoder neural network 320 is a LSTM decoder network, an attention network, or a neural network configured in accordance with a reinforcement-learning (RL) approach.

As discussed above, in some embodiments, training module 220 trains additional decoder neural networks 320 for specific purposes using the latent space 235 for the particular user (e.g., the driver of vehicle 100) as input. For example, in one embodiment, training module 220 trains a second decoder neural network 320 to predict future behavior of the particular driver for whom the latent space 235 was generated, and training module 220 trains a third decoder neural network 320 to label observed behavior of the particular driver. An example of such an embodiment including three decoder neural networks 320 is shown in FIG. 3.

As discussed above, in an embodiment in which training module 220 uses the latent space 235 as input to train a decoder neural network 320 associated with a particular existing HMI 240 among one or more existing HMIs 240 of vehicle 100 to alter operation of that particular existing HMI 240, the training can involve any of several different kinds of HMI changes or adjustments. Examples include, without limitation, (1) tuning a continuous parameter of a safety-related system of the vehicle 100 (e.g., tuning a time/distance threshold of a collision warning system); (2) changing the frequency of activation and the intensity of one or more visual indicators (lights, displays, etc.) in vehicle 100; (3) changing the frequency of activation and the volume of one or more audible indicators (beeps, chimes, computer-synthesized or recorded spoken messages, etc.) in vehicle 100; and (4) changing whether vehicle 100 automatically activates or deactivates a feature in response to detection of a predetermined situation. Such customized adjustments to existing HMIs are made possible by what the latent space 235 captures regarding the particular driver's behavior and preferences.

As also discussed above, whether training module 220 is using latent space 235 as input to train a decoder neural network 320 associated with a new HMI 245 or an existing HMI 240, in some embodiments the input data 230 for supervised training can include examples of effective driver coaching/teaching, and training module 220 can train the decoder neural network 320 to coach the driver concerning the new HMI 245 or the existing HMI 240. In some embodiments, training module 220 trains the decoder neural network to coach the particular driver concerning the control of an operational mode of the robot (e.g., vehicle 100). Such control can include activation, deactivation, regulation, adjustment, etc. For example, the coaching can assist the particular driver in interacting with an ACC system, a collision warning system, a LKAS, or other vehicle systems. In an eventual test/inference deployment of the trained decoder neural network 430 in vehicle 100 as part of an in-vehicle HMI management system 170, the particular driver can receive coaching that includes instructional or informational tips or prompts. For example, if the latent space 235 of a particular driver captures that the driver is not very technologically savvy, a new HMI 245 can be configured, by virtue of the training the decoder neural network 320 received from training module 220, to be generous with coaching/prompting to assist the driver in using an advanced feature such as ACC or lane-keeping assistance.

As indicated in block 530, a trained decoder neural network 430 can be deployed in the vehicle 100 to control, at least in part, the operation of the new HMI 245 or the particular existing (altered) HMI 240 in accordance with the learned behavior and characteristics of the particular user. As discussed above, the driver's learned behavior and characteristics are represented compactly and efficiently by the driver's latent space 235 generated by HMI training system 200. As also discussed above, the latent space 235 is used as input by the training module 220 of HMI training system 200 to train a decoder neural network 320 associated with the applicable HMI. This enables the HMI control module 420 of HMI management system 170 to employ a trained decoder neural network 430 downloaded from HMI training system 200 to at least partially control the operation of the associated new HMI 245 or existing HMI 240 in a manner that is customized or personalized for the driver of vehicle 100.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for learning and managing robot user interfaces, the system comprising:

a processor; and
a memory storing machine-readable instructions that, when executed by the processor, cause the processor to:
generate, based on input data that includes information about past interactions of a particular user with a robot and with one or more existing Human-Machine Interfaces (HMIs) of the robot, a latent space using one or more encoder neural networks, wherein the latent space is a reduced-dimensionality representation of learned behavior and characteristics of the particular user; and
use the latent space as input to train a first decoder neural network associated with one of (1) a new HMI of the robot distinct from the one or more existing HMIs of the robot and (2) a particular HMI among the one or more existing HMIs of the robot to alter operation of the particular HMI;
wherein the trained first decoder neural network is deployed in the robot to control, at least in part, operation of one of the new HMI and the particular HMI in accordance with the learned behavior and characteristics of the particular user.

2. The system of claim 1, wherein the robot is a vehicle and the particular user is a driver of the vehicle.

3. The system of claim 2, wherein the machine-readable instructions to use the latent space as input to train a first decoder neural network associated with a particular HMI among the one or more existing HMIs of the robot to alter operation of the particular HMI include instructions that, when executed by the processor, cause the processor to train the first decoder neural network to perform one of:

tuning a continuous parameter of a safety-related system of the vehicle;
changing a first frequency of activation and an intensity of one or more visual indicators in the vehicle;
changing a second frequency of activation and the volume of one or more audible indicators in the vehicle; and
changing whether the vehicle automatically activates or deactivates a feature in response to detection of a predetermined situation.

4. The system of claim 1, wherein the robot is a service robot.

5. The system of claim 1, wherein the machine-readable instructions include further instructions that, when executed by the processor, cause the processor to:

use the latent space as input to train a second decoder neural network to predict future behavior of the particular user; and
use the latent space as input to train a third decoder neural network to label observed behavior of the particular user.

6. The system of claim 1, wherein the one or more encoder neural networks include a Long Short-Term Memory (LSTM) encoder, an attention network, and a transformer network and the first decoder neural network is one of a fully connected neural network, an LSTM decoder, an attention network, and a reinforcement-learning-based network.

7. The system of claim 1, wherein the machine-readable instructions to use the latent space as input to train the first decoder neural network include instructions that, when executed by the processor, cause the processor to train the first decoder network to coach the particular user concerning one of the new HMI, the particular HMI, and control of an operational mode of the robot.

8. The system of claim 1, wherein the information about the past interactions of the particular user with the robot and with the one or more existing HMIs of the robot includes one or more questionnaire responses from the particular user.

9. A non-transitory computer-readable medium for learning and managing robot user interfaces and storing instructions that, when executed by a processor, cause the processor to:

generate, based on input data that includes information about past interactions of a particular user with a robot and with one or more existing Human-Machine Interfaces (HMIs) of the robot, a latent space using one or more encoder neural networks, wherein the latent space is a reduced-dimensionality representation of learned behavior and characteristics of the particular user; and use the latent space as input to train a first decoder neural network associated with one of (1) a new HMI of the robot distinct from the one or more existing HMIs of the robot and (2) a particular HMI among the one or more existing HMIs of the robot to alter operation of the particular HMI;

wherein the trained first decoder neural network is deployed in the robot to control, at least in part, operation of one of the new HMI and the particular HMI in accordance with the learned behavior and characteristics of the particular user.

10. The non-transitory computer-readable medium of claim 9, wherein the robot is a vehicle and the particular user is a driver of the vehicle.

11. The non-transitory computer-readable medium of claim 10, wherein the instructions to use the latent space as input to train a first decoder neural network associated with a particular HMI among the one or more existing HMIs of the robot to alter operation of the particular HMI include instructions that, when executed by the processor, cause the processor to train the first decoder neural network to perform one of:

tuning a continuous parameter of a safety-related system of the vehicle;

changing a first frequency of activation and an intensity of one or more visual indicators in the vehicle;

changing a second frequency of activation and the volume of one or more audible indicators in the vehicle; and changing whether the vehicle automatically activates or deactivates a feature in response to detection of a predetermined situation.

12. The non-transitory computer-readable medium of claim 9, wherein the instructions include further instructions that, when executed by the processor, cause the processor to:

use the latent space as input to train a second decoder neural network to predict future behavior of the particular user; and use the latent space as input to train a third decoder neural network to label observed behavior of the particular user.

13. A method, comprising:

generating, based on input data that includes information about past interactions of a particular user with a robot and with one or more existing Human-Machine Interfaces (HMIs) of the robot, a latent space using one or more encoder neural networks, wherein the latent space is a reduced-dimensionality representation of learned behavior and characteristics of the particular user; and using the latent space as input to train a first decoder neural network associated with one of (1) a new HMI of the robot distinct from the one or more existing HMIs of the robot and (2) a particular HMI among the one or more existing HMIs of the robot to alter operation of the particular HMI;

wherein the trained first decoder neural network is deployed in the robot to control, at least in part, operation of one of the new HMI and the particular HMI in accordance with the learned behavior and characteristics of the particular user.

14. The method of claim 13, wherein the robot is a vehicle and the particular user is a driver of the vehicle.

15. The method of claim 14, wherein the using the latent space as input to train a first decoder neural network associated with a particular HMI among the one or more existing HMIs of the robot to alter operation of the particular HMI includes training the first decoder neural network to perform one of:

tuning a continuous parameter of a safety-related system of the vehicle;

changing a first frequency of activation and an intensity of one or more visual indicators in the vehicle;

changing a second frequency of activation and the volume of one or more audible indicators in the vehicle; and changing whether the vehicle automatically activates or deactivates a feature in response to detection of a predetermined situation.

16. The method of claim 13, wherein the robot is a service robot.

17. The method of claim 13, further comprising:

using the latent space as input to train a second decoder neural network to predict future behavior of the particular user; and using the latent space as input to train a third decoder neural network to label observed behavior of the particular user.

18. The method of claim 13, wherein the one or more encoder neural networks include a Long Short-Term Memory (LSTM) encoder, an attention network, and a transformer network and the first decoder neural network is one of a fully connected neural network, an LSTM decoder, an attention network, and a reinforcement-learning-based network.

19. The method of claim 13, wherein the using the latent space as input to train the first decoder neural network includes training the first decoder network to coach the particular user concerning one of the new HMI, the particular HMI, and control of an operational mode of the robot.

20. The method of claim 13, wherein the information about the past interactions of the particular user with the robot and with the one or more existing HMIs of the robot includes one or more questionnaire responses from the particular user.

* * * * *